United States Patent
Asbun et al.

(10) Patent No.: US 8,607,091 B2
(45) Date of Patent: Dec. 10, 2013

(54) SYSTEM, METHOD AND COMPUTER READABLE MEDIUM FOR PROVIDING REDUNDANCY IN A MEDIA DELIVERY SYSTEM

(75) Inventors: Eduardo Asbun, San Diego, CA (US); Robert Wallace, Portsmouth, RI (US)

(73) Assignee: Alcatel Lucent, Paris (FR)

( * ) Notice: Subject to any disclaimer, the term of this patent is extended or adjusted under 35 U.S.C. 154(b) by 138 days.

(21) Appl. No.: 13/049,531

(22) Filed: Mar. 16, 2011

(65) Prior Publication Data

US 2011/0167304 A1 Jul. 7, 2011

Related U.S. Application Data

(63) Continuation of application No. 12/074,671, filed on Mar. 5, 2008, now Pat. No. 7,975,166.

(51) Int. Cl.
*G06F 11/00* (2006.01)

(52) U.S. Cl.
USPC .......................................................... 714/4.1

(58) Field of Classification Search
USPC ........... 714/1–3, 4.1, 4.11, 4.12, 4.3, 4.4, 4.5, 714/15, 16, 18, 41, 57, 774, 799
See application file for complete search history.

(56) References Cited

U.S. PATENT DOCUMENTS

| | | | |
|---|---|---|---|
| 5,875,290 A | 2/1999 | Bartfai et al. | |
| 5,983,371 A * | 11/1999 | Lord et al. | 714/55 |
| 6,515,967 B1 * | 2/2003 | Wei et al. | 370/244 |
| 6,728,780 B1 * | 4/2004 | Hebert | 709/239 |
| 6,732,186 B1 * | 5/2004 | Hebert | 709/239 |
| 6,763,479 B1 * | 7/2004 | Hebert | 714/4.11 |
| 7,159,234 B1 | 1/2007 | Murphy et al. | |
| 7,385,978 B1 | 6/2008 | Yang et al. | |
| 7,634,683 B2 * | 12/2009 | De La Cruz et al. | 714/4.1 |
| 7,752,486 B2 * | 7/2010 | Satran et al. | 714/4.1 |
| 8,225,129 B2 * | 7/2012 | Douglis et al. | 714/2 |
| 2001/0056554 A1 | 12/2001 | Chrabaszca | |
| 2002/0184376 A1 | 12/2002 | Sternagle | |
| 2004/0078632 A1 * | 4/2004 | Infante et al. | 714/5 |
| 2004/0268177 A1 * | 12/2004 | Ji et al. | 714/6 |
| 2005/0147087 A1 | 7/2005 | Sternagle | |
| 2005/0172161 A1 | 8/2005 | Cruz et al. | |
| 2005/0198327 A1 | 9/2005 | Iwamura et al. | |
| 2005/0268145 A1 | 12/2005 | Hufferd | |
| 2005/0273645 A1 * | 12/2005 | Satran et al. | 714/4 |
| 2007/0025252 A1 * | 2/2007 | McGee et al. | 370/235 |
| 2007/0140155 A1 | 6/2007 | Yu | |
| 2007/0245167 A1 | 10/2007 | De La Cruz et al. | |

(Continued)

FOREIGN PATENT DOCUMENTS

| JP | 2001167075 A | 6/2001 |
|---|---|---|
| JP | 2005521334 | 7/2005 |

(Continued)

*Primary Examiner* — Nadeem Iqbal
(74) *Attorney, Agent, or Firm* — RGIP LLC

(57) ABSTRACT

In a digital video system, high availability distribution is provided using spare modules such as an integrated receiver decoder, multimedia transcoder and streaming module in support of the primary modules. The primary modules multicast status messages which are monitored by the spare modules. When failure of a primary module is detected, the spare module takes over the role of the failed module, for example by joining the same multicast groups as the failed module and taking over processing of the streams of the failed module. Multiple redundancy schemes are described.

20 Claims, 7 Drawing Sheets

(56) References Cited

U.S. PATENT DOCUMENTS

2007/0268820 A1* 11/2007 McGee et al. ................ 370/217
2008/0002591 A1   1/2008 Ueno
2008/0201602 A1   8/2008 Agarwal et al.
2008/0256384 A1* 10/2008 Branson et al. ................... 714/4

FOREIGN PATENT DOCUMENTS

| JP | 2006129071 | 5/2006 |
| WO | WO01/30023 | 4/2001 |
| WO | WO03/081845 | 10/2003 |
| WO | 2005003951 | 1/2005 |

* cited by examiner

SYSTEM, METHOD AND COMPUTER READABLE MEDIUM FOR PROVIDING REDUNDANCY IN A MEDIA DELIVERY SYSTEM

CROSS-REFERENCES

This application is a continuation application of U.S. application Ser. No. 12/074,671, filed Mar. 5, 2008, entitled "SYSTEM, METHOD AND COMPUTER READABLE MEDIUM FOR PROVIDING REDUNDANCY IN A MEDIA DELIVERY SYSTEM".

FIELD OF THE INVENTION

This invention relates to digital video systems and in particular to providing high availability TV distribution systems for mobile and wireline media delivery applications.

BACKGROUND OF THE INVENTION

Digital video systems allow TV content to be provided to mobile devices such as mobile phones, palm devices, etc as well as wireline devices using IP protocols. An issue with providing live TV feeds is that carriers seek high availability for their systems.

A solution to providing high availability is to use a central entity that monitors the health of the active modules ("primaries") in the system. The central entity may query the active modules or the modules may send a heartbeat signal. When a failure occurs, the central entity activates a spare to replace a failed module. However, if the central entity fails, the entire system is vulnerable to failures. In addition, queries or the heartbeat signals may get lost and the failure may go undetected. This solution can also have unmanageable complexity and cost because it must scale to support hundreds of channels.

An alternative solution is to use a device that monitors the output of the primaries. Upon detecting a failure, it activates a spare. Monitoring the output of a module works well when the output can be easily verified. However, corrupted output may appear valid unless it is completely decoded. In addition, monitoring a large number of outputs may not be practical and adds cost and complexity to the system.

What is required is a system, method and computer readable medium for providing high availability in a digital video system.

SUMMARY OF THE INVENTION

In accordance with one aspect of the disclosure, there is provided a media delivery system comprising at least one primary module; at least one spare module that monitors said at least one primary module and upon detection of failure of said at least one primary module, performs a function of a failed primary module.

In accordance with one aspect of the disclosure, there is provided a digital video system comprising at least one primary upstream module and at least one spare upstream module, wherein said at least one spare upstream module duplicates said at least one primary upstream module.

In accordance with one aspect of the disclosure, there is provided a method for switching a redundant device to an active state comprising, in said redundant device, receiving multicast status messages from one or more active devices; in said redundant device, determining a health of said one or more active devices from said status messages; upon determining that a health of said one or more active devices is unhealthy, switching said redundant device to perform a function of an unhealthy device.

In accordance with one aspect of the disclosure, there is provided a method of providing redundancy in a media delivery system comprising providing a primary module; providing a spare module in a monitoring state; monitoring performance of said primary module using said spare module; detecting failure of said primary module; and switching said spare module from said monitoring state to perform a role of said primary module.

In accordance with one aspect of the disclosure, there is provided a computer readable medium comprising instructions for receiving periodic status messages from one or more primary modules, said status messages indicating a function of said one or more primary modules; determining an absence of said periodic status messages from a failed primary module of said one or more primary modules; performing a function of said failed primary module.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
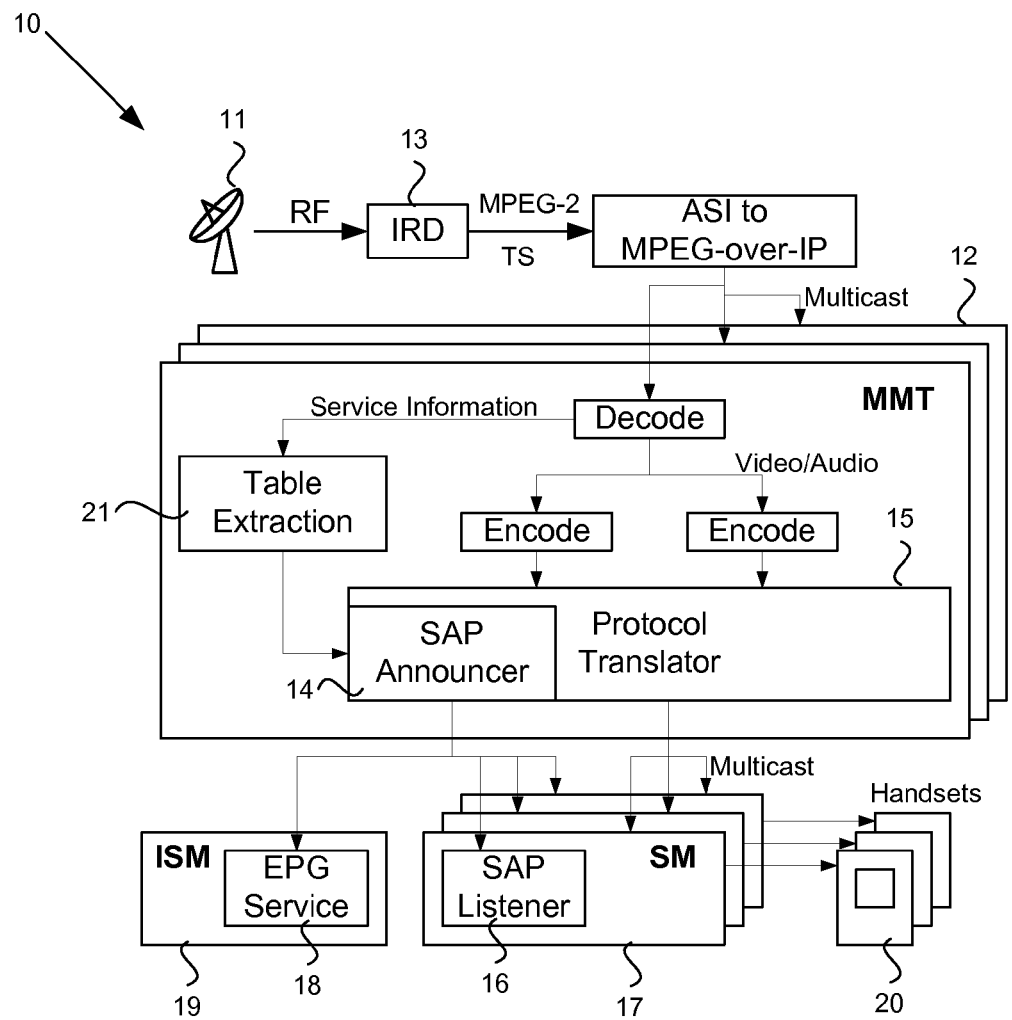
FIG. 1 schematically represents a media delivery system.

In FIG. 1, there is shown a system 10 that provides high availability using a Multimedia Transcoder (MMT) 12 to receive and process live TV feeds. FIG. 1 shows the MMT 12, Streaming Module (SM) 17 and the Integration Services Module 19 (ISM), aka, Application Module. Prior art digital video systems establish unicast sessions between the Multimedia Transcoder (MMT) and the Streaming Module (SM). This scheme does not scale well when the number of MMTs, SMs and handsets 20 grows significantly. The present embodiments therefore use multicasting to improve both performance and reliability.

The MMT 12 can accept input from a variety of sources, such as satellite, cable, and over-the-air. For the purpose of illustration, the MMT 12 is depicted as receiving input from Digital Video Broadcast (satellite) (DVB-S). For DVB-S, the live TV feeds will be obtained off a satellite 11 or internal distribution system at the carrier's site. The satellite feed is routed to an Integrated Receiver Decoder (IRD) 13 that receives the RF signal, demodulates the MPEG-2 transport stream, and then sends it out directly over IP or over Asynchronous Serial Interface (ASI), since ASI is a serial data transmission method that allows packet-based transmission of compressed video, such as MPEG-2 transport streams. The system 10 can be simplified if the IRD 13 itself supports MPEG-2 over IP directly. Otherwise, a third-party system can be used to packetize the ASI input and send it as MPEG-2- over-IP to the MMTs 12. Several vendors, such as Scopus Video Networks and Novra Technologies, provide the type of IRDs that support IP and/or ASI outputs.

Multicasting is used to distribute the transport streams to the MMTs 12. The benefits of using multicasting when sending an MPEG-2 over IP to the MMT 12 include allowing an MMT to choose whether it wants to receive a stream. That is, the multicast traffic is received only if the MMT belongs to the multicast group. The MMT 12 informs the router/switch that it wishes to join a group by sending it a request. After the router/switch receives the request, the multicast traffic for that group starts being delivered to the MMT. The router/switch periodically queries the MMT for membership to groups. It stops delivering the traffic when the MMT does not reply to its query or if the MMT wishes to leave the group. Several mid-range Ethernet Switch products support Internet Group Management Protocol (IGMP) thus eliminating the need for a multicast router in the system.

A SAP Announcer 14 in the Protocol Translator (PT) 15 sends Session Description Protocol (SDP) information to SAP Listeners 16 in both the SM(s) 17 and the Electronic Program Guide (EPG) Service module 18 in the ISM 19. In the system 10, the SAP announcement carries two different types of payloads:

Session Description Protocol (SDP) information (type='application/sdp'), including the description of the available multicast sessions that the SM(s) 17 can receive from the MMT(s) 12.

DVB Service Information (type='application/x-pvns-dvb-si'), including all the relevant information extracted from DVB-SI. This information will be formatted by a Table Extraction module 21 within the MMT 12 and provided to the SAP announcer 14.

A multicast group consisting of the SM(s) 17 and the ISM 19 will receive the SAP announcements from the MMT 12. The SM 17 will use the SDP descriptions carried in the announcements to learn about the sessions available, and to receive and process some of them for delivery to handsets 20. The ISM 19 will use the service information in the announcements to create an electronic program guide of the programs available to the user. The electronic program guide can then be delivered to the handsets 20 on-demand or as an additional program in the channel lineup.

Figure 6:
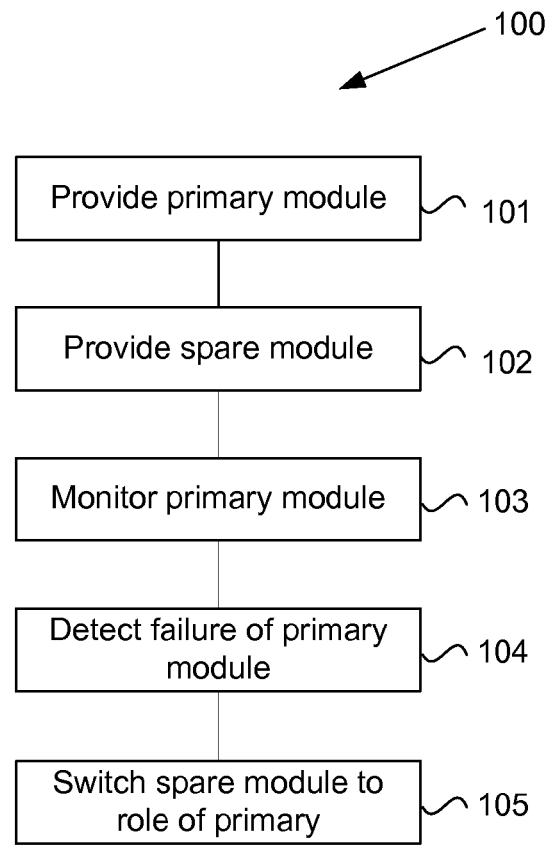
FIG. 6 represents a flowchart of a redundancy method.

In accordance with an embodiment of the disclosure, in order to provide high availability, the system 10 distributes redundancy by using multiple MMTs, SMs and IRDs. In such a system, one or more modules (MMT or IRD) are designated as spare and remain in standby state, while the primary(ies) are online. Upon failure of one module, the spare takes over the function of the failed module, changing its state to online and starts processing, minimizing the downtime of the system. The distributed redundancy scheme thus has no additional systems/modules to monitor the operation of the MMTs, SMs or IRDs. The redundancy methodology is illustrated in the flow diagram 100 of FIG. 6. Primary modules and spares modules are established at steps 101, 102. The spare module monitors the performance of the primary modules (step 103). Upon detecting failure of the primary module (step 104), the spare module switches to performing a role of the failed module (step 105).

Figure 7:
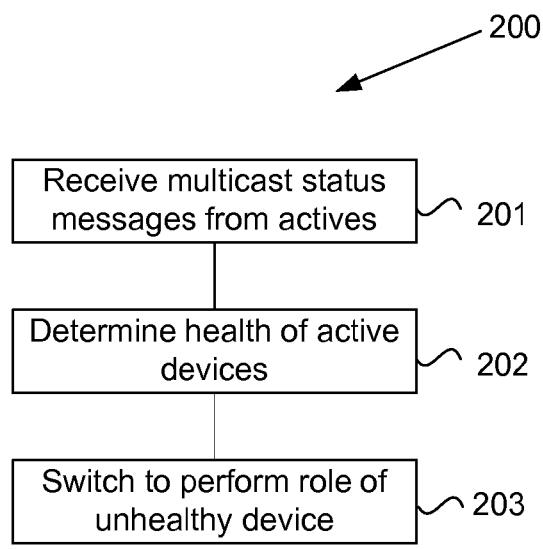
FIG. 7 represents a flowchart of a redundancy method from a spare module perspective.

Taking over the function of a failed module entails establishing a multimedia session with an upstream encoder or transcoder. Therefore, session state information in addition to status must be sent to the spare. Having session state as well as status allows the distributed monitoring functionality to assess potential trends in the session state, allowing for potential failure avoidance as well as failure detection. Such failure avoidance capabilities greatly improve overall system and service availability. The perspective of the spare module is illustrated in the flowchart 200 of FIG. 7. The spare module monitors the multicast status messages from the primary devices (step 201). If any of the primary devices are determined to be unhealthy (step 202), the spare device switches from a monitoring state to a state of performing the function of the failed device (step 203).

Two different redundancy schemes are described below. In a first redundancy scheme (Case A), one or more spare modules are used to take over the function of a failed module. In a second redundancy scheme (Case B), healthy primary modules take over, i.e. share, the function of a failed module without a spare module being used.

For Case A, the spare is not used while the primaries are healthy. This redundancy scheme is known as "N-to-1 Redundancy". The system can tolerate the failure of up to one primary for each spare.

For Case B, no module is designated as spare. Rather, all modules in the system act as primaries. This is known as a "Load Balancing System." In the case of a failure, the work of the failed primary is redistributed among the remaining healthy primaries. This type of redundancy has the added benefit that no spare is needed, thus decreasing the overall cost of the system.

Figure 2:
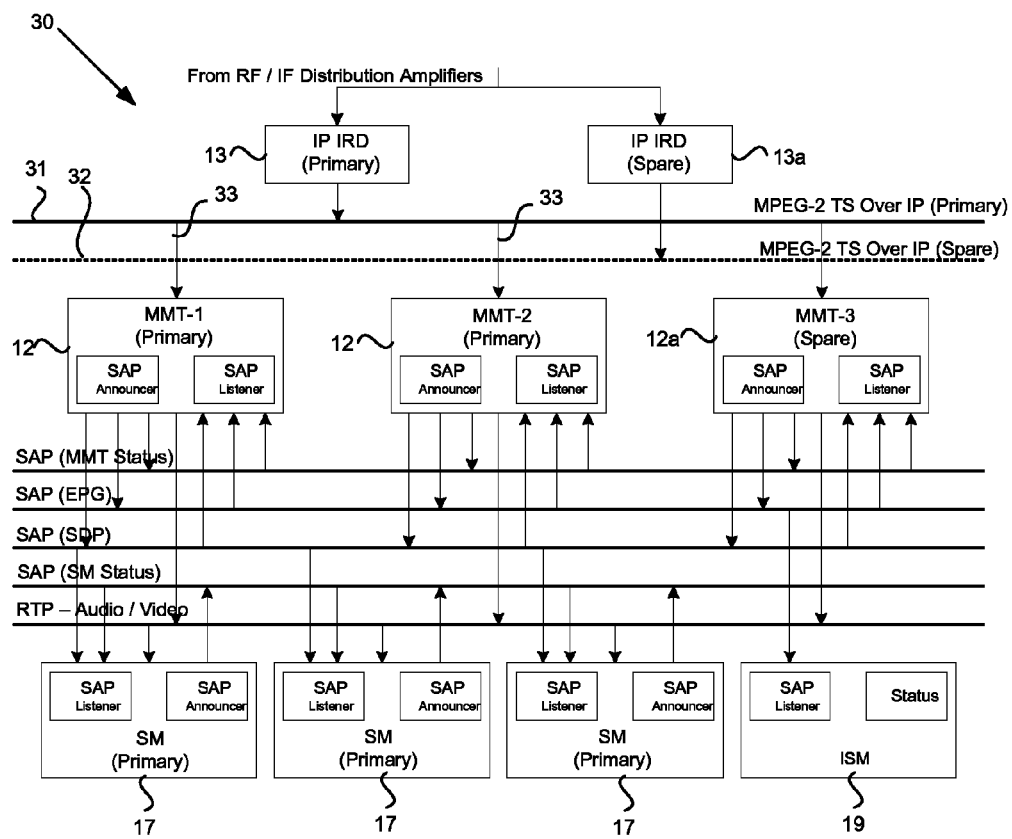
FIG. 2 schematically represents a redundancy scheme of a media delivery system.

An embodiment of a redundancy scheme 30 is illustrated in FIG. 2. The redundancy scheme shows one spare IRD 13a for each primary IRD 13. The spare IRD 13a is preconfigured with the Program Identifiers (PID) set selection of the programs that will be transmitted to the MMT(s) 12. Each IRD 13, 13a transmits in a predetermined multicast address and port. The redundancy scheme 30 shows two primary MMT(s) 12 and a spare MMT 12a. Any number of spare MMTs 12a may be provided, as will be described below.

Multicasting is used to deliver MPEG-over-IP traffic from the IRDs 13 to the MMTs 12. Each MMT 12 in the digital video system will receive a number of transport streams that it will process and send to the SM(s) 17. An MMT 12 informs the router it wishes to belong to the appropriate multicast group that carries the TS it needs.

Figure 3:
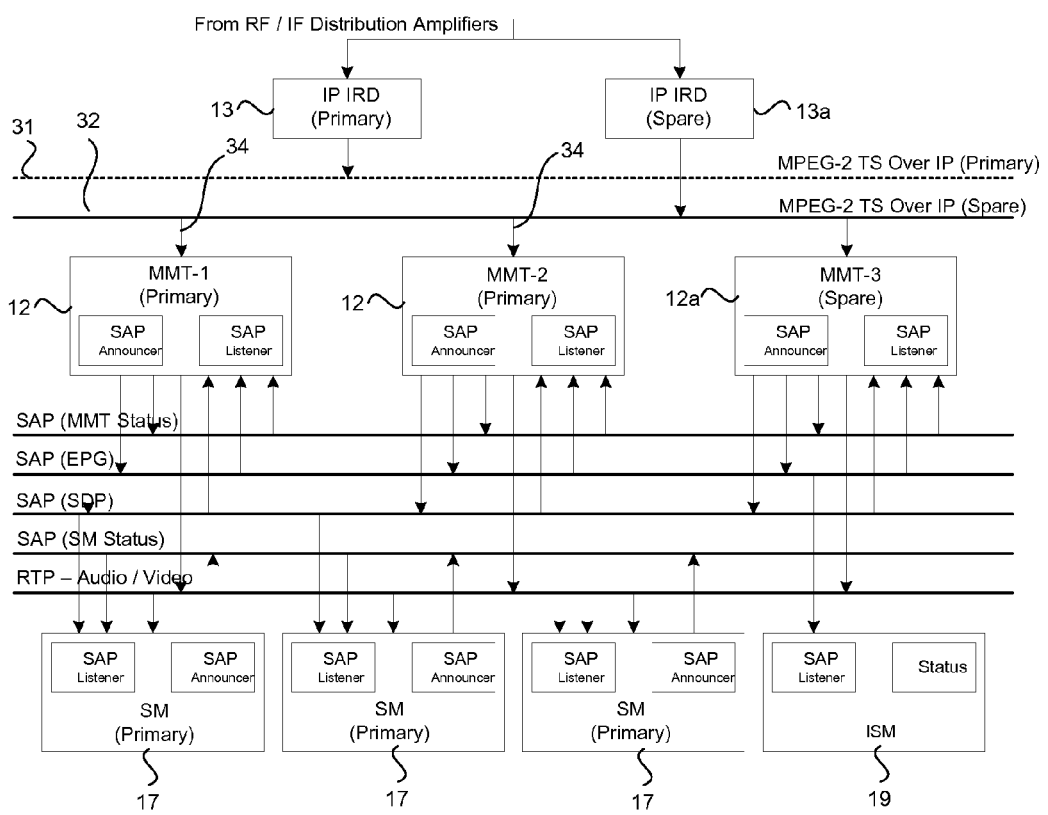
FIG. 3 schematically represents failure of an integrated receiver decoder.

In normal operation, the MMT(s) 12 receive the MPEG-2 streams 31 from the primary IRD 13, denoted by links 33. As illustrated in FIG. 3, upon failure of the primary IRD 13, the MMTs 12 detect the loss of the corresponding multicast streams 31, leave the primary IRD's 13 multicast group, and join the multicast group (denoted by links 34) of the spare IRD 13a and thus receive the duplicated multicast stream 32. An MMT 12 is able to detect if it is receiving TS packets at the expected rate. An MMT 12 can also determine that there are no errors in the packet structure and that it still has a decodable output even if it is a black screen. In between the time the MMT detects the loss of the multicast stream from the primary IRD 13 and the time it reacquires the stream from the spare IRD 13a, the MMT will continue encoding the last frame received and insert silence in the audio path.

To provide monitoring of MMT performance, each MMT 12 is configured to multicast a periodic "heartbeat" message to the other MMTs indicating its status. This message is multicast as a SAP announcement to the other MMTs in the system. Therefore, all MMTs in the system belong to the "All MMTs SAP redundancy multicast group." The SAP redundancy announcement carries all the information necessary for the spare MMT 12a to monitor the status of the primary MMT(s) 12 and to take over a failed MMT, including:

MMT role (Primary, Spare);
MMT state (Online, Offline, Standby);
MMT status (OK, Warning, Error, Fatal);

Multicast group address(es) from which it is receiving the input streams it is currently processing;

Multicast group address(es) to which it is sending the processed streams;

Multicast group address(es) to which it is sending the SAP announcements for both the SDP and the EPG information.

The MMT role can be:

Primary: The MMT processes the input streams and sends them to the SM. It periodically determines its status and sends a SAP announcement with its activity information;

Spare: The MMT monitors the SAP announcements from the primary(ies) and gathers information about the multicast addresses being used by them to send information to the SM(s). Upon a failure of a primary, the spare changes its state to online and takes over the processing of the streams of the failed MMT.

The MMT State can be:

Online: The MMT is actively processing input streams and sending them to the SM(s);

Offline: The MMT is not in service and does not monitor nor send any SAP announcements, and does not process any streams;

Standby: The MMT actively monitors SAP announcements but does not process any input streams. It can take over upon failure of a MMT. It also sends SAP announcements. The primary does not monitor SAP announcements; therefore, it can't be in this state.

The MMT status can be:

OK: Normal operating condition;

Warning: The MMT has encountered a problem and may go offline. The redundant module will get ready to take over the failed module's streams if it receives an Error message. For example, it can request membership in the appropriate multicast groups;

Error: The MMT is unable to continue processing its assigned input streams, and informs the spare MMT to take over. The redundant MMT will continue processing the failed MMTs' streams until it receives an OK status from the failed MMT;

Fatal: The MMT is offline and operator assistance is required.

It is possible that one or more heartbeat messages may be lost due to network traffic or connectivity failure. To prevent false failure detections, the spare MMT 12a waits until a configurable number of announcement messages (e.g. 3) from an MMT are missing.

To be able to failover an MMT in a timely manner, the periodicity of the announcement (heartbeat) messages can be changed depending on the requirements of the carrier. In one embodiment, the period is user configurable in the range [0.1, 10.0] seconds, in steps of 0.1 seconds, with a default of 1.0 second. Therefore, a failure of an MMT could be detected and corrected in as little as 0.3 seconds if the spare MMT 12a waits until 3 announcement messages are missing.

Figure 4:
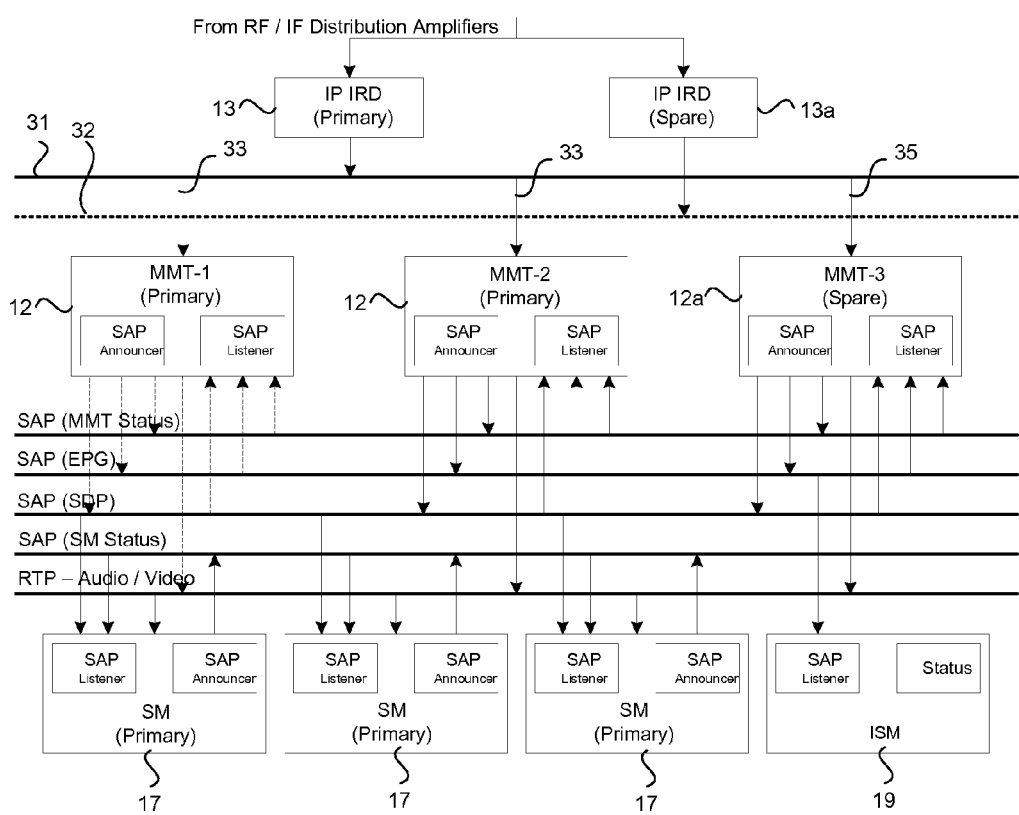
FIG. 4 schematically represents failure of a multimedia transcoder.

Failure of an MMT is illustrated in FIG. 4. When as MMT fails, such as MMT-1, the spare MMT 12a takes over processing of the streams of the failed MMT, depicted by link 35, therefore subscribing to the appropriate multicast group in order to receive the failed MMT's streams. During the switchover, both the primary and spare MMTs will output a black screen and insert silence in the audio path.

While one redundant MMT is illustrated, the redundancy scheme 30 may provide multiple redundant MMTs depending on the size of the digital video system, service level requirements, etc. If there is more than one spare MMT in the system, they may be numbered sequentially (1, 2, etc), such that the spare MMT 1 will take over the first failed MMT, and so on. If more than one MMT fails at the same time, the spare MMT 1 will take over the failed MMT with the lowest IP address, and so on. MMTs may be designated as spares for the entire system or, using multicast groupings, the MMTs may be divided into groups with one or more spares being designated specifically to a group.

Figure 5:
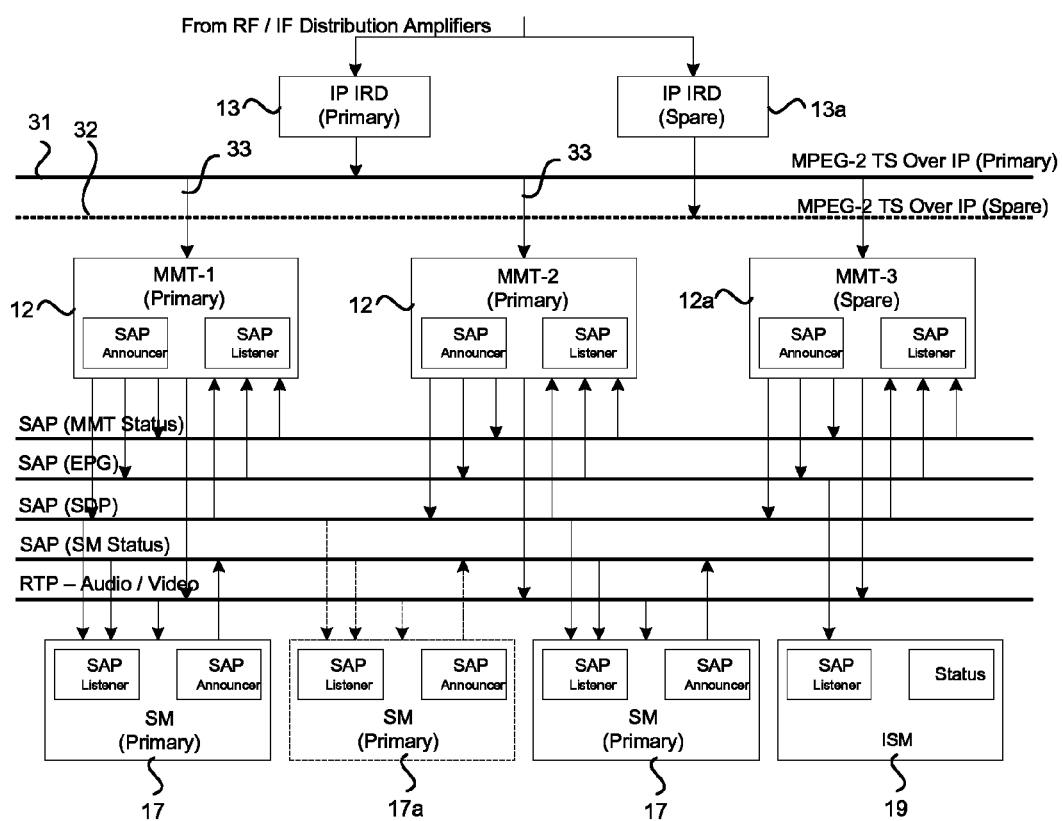
FIG. 5 schematically represents failure of a streaming module.

To minimize the probability of a session breaking down due to failure of an SM 19, the SMs 19 perform load balancing rather than providing unused SM modules 19. Thus, contrary to the scheme used by the MMT, all SMs are online and processing streams at any given time. When an SM fails, such as SM 17a shown in ghosted outline in FIG. 5, all the sessions in the failed SM go down and need to be manually reestablished by the users. The SAP announcement by the SM(s) 17 carry all the information necessary for other modules in the system to monitor the status of SMs, including:

SM role (Primary);

SM state (Online, Offline, Standby);

SM status (OK, Warning, Error, Fatal);

SDP sessions that it is currently receiving and transmitting.

Figure 8:
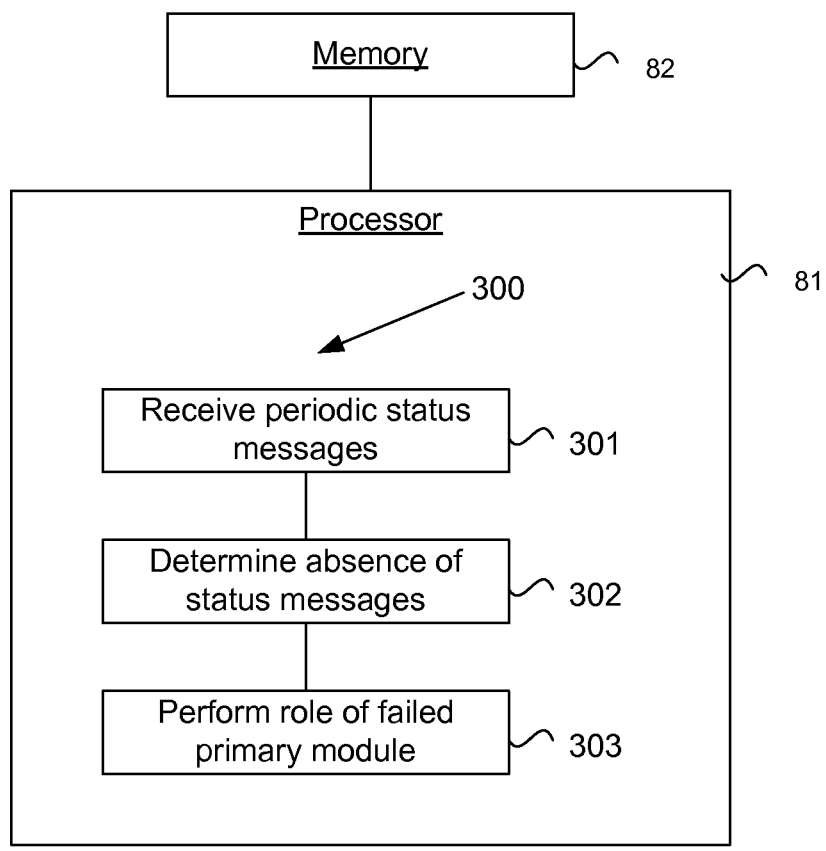
FIG. 8 represents a processor executing an instruction set.

In one embodiment, all or a portion of the described and depicted methods and steps can be accomplished via a computer readable medium that comprises instructions (i.e. software) which can be fully or partially executed by or run on one or more of the described and depicted elements. For example, with reference to FIG. 8, a computer readable medium that comprises instructions 300 can be executed by or run on at least one processor 81 operatively associated with at least one memory 82. In differing embodiments, the processor 81 and memory 82 may exist within the IRD, MMT or SM. The instructions 300 may include instructions for receiving periodic status messages from one or more of the primary modules (step 301), determining an absence of the periodic status messages from a failed primary module (step 302) and performing a function of the failed primary module (step 303).

The above described embodiments demonstrate a distributed redundancy system with a protocol where the spare module actively monitors the status of the primaries. Upon detecting a failure, the spare takes over the function of the failed primary. No external entities are used to supervise the operation of modules in the system, nor is the output of the system monitored. While the distributed redundancy system was designed for use in highly available TV distribution systems for mobile and wireline media delivery applications, the person skilled in the art will recognize that the same principles can be used in other types of systems.

An advantage of the above described embodiments include that content providers minimize lost revenue from down time due to module failure. The system uses two different redundancy schemes, that combined, provide a solution that is both scalable and robust. The redundancy scheme is relatively low-cost and deployment is easy because external modules are not required.

Although embodiments of the present invention have been illustrated in the accompanying drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A system, comprising:
   a plurality of primary devices configured to perform a load balance process of input streams of data received by the plurality of primary devices and detect a failure of at least one of the primary devices via an absence of periodic heartbeat messages shared among the plurality of devices; and
   upon detection of the failure of the at least one of said primary devices, the remainder of said plurality of primary devices perform at least one function of the failed primary device, the function balanced by and between the remainder of said plurality of primary devices based on a redistribution of the at least one failed primary device's present work load, wherein the remainder of said plurality of primary devices are recognized by the system as at least ones not designated as spare devices.

2. The system according to claim 1 wherein at least one primary device of said primary devices comprises at least one multimedia transcoder.

3. The system according to claim 2 wherein said at least one primary device provides a status message and wherein at least another primary of said primary devices determines a status of said at least one primary device from said status message.

4. The system according to claim 3 wherein said at least another primary device determines a failure of said at least one primary device if greater than a threshold number of status messages are not received from said at least one primary device.

5. The system according to claim 3 wherein said at least one primary device multicasts said status message.

6. The system according to claim 3 wherein said at least one another device determines from said status message one or more multicast groups from which said failed primary device is receiving one or more input streams.

7. The system according to claim 6 wherein upon detection of failure of said failed primary device, said another device joins said one or more multicast groups.

8. The system according to claim 3 wherein said at least one another device determines from said status message one or more multicast groups to which a failed primary device is sending processed streams.

9. The system according to claim 8 wherein upon detection of failure of said failed primary device, said another device joins said one or more multicast groups.

10. The system according to claim 3 wherein said status message is provided at a regular period between 0.1 and 10.0 seconds.

11. The system according to claim 1 wherein said at least one primary device and said at least one another device comprise at least one streaming device.

12. The system according to claim 11 wherein said at least one primary device provides a SAP announcement providing status information to said at least one another device and wherein said at least one another device determines a status of said at least one primary device from said SAP announcement.

13. The system according to claim 12 wherein each primary device monitors said SAP announcement and wherein each primary device and each another device share a function of a failed primary device.

14. The system according to claim 1 comprising a digital video system.

15. A system, comprising:
    at least one primary upstream device; and
    at least another primary upstream device separate from the at least one primary upstream device wherein each of said primary upstream devices are configured to perform a load balance process of input streams of data received by said primary upstream devices and detect a failure of at least one of the primary upstream devices via an absence of a periodic heartbeat messages shared among the primary upstream devices;
    upon the detection of the failure of said at least one primary upstream device, said at least another primary upstream device performs at least one function of the failed primary device, the function provided by said at least one another upstream device based on a redistribution of the at least one failed primary upstream device's present work load, wherein said another one upstream device is recognized by the system as not being designated as a spare device.

16. The system according to claim 15 further comprising at least one downstream device that:
    receives data from said at least one primary upstream device; and
    upon detection of failure of said at least one upstream device, connects to said at least one another upstream device.

17. The system according to claim 16 wherein said at least one primary upstream device multicasts to said at least one downstream device.

18. The system according to claim 16 wherein said at least one primary upstream device and said at least one another upstream device comprise an integrated receiver decoder.

19. A method, comprising:
    in another device, receiving multicast status messages from one or more other devices separate from said another device wherein any of said devices are configured to perform a load balance process of input streams of data received by said devices and detect a failure of at least one of the devices via an absence of a periodic heartbeat messages shared among each of the devices; and
    upon determining that the at least one device has failed, switching said another device to perform a function of said failed at least one device so the another device performs at least one function of the failed at least one device, the function based on a redistribution of the at least one failed device's present work load, wherein said another device is recognized by the system as not being designated as a spare device.

20. A method according to claim 19, comprising multitasking status messages from said one or more devices, said status messages indicating the health of said one or more devices and indicating a performance of said one or more devices.

* * * * *